UNITED STATES PATENT OFFICE.

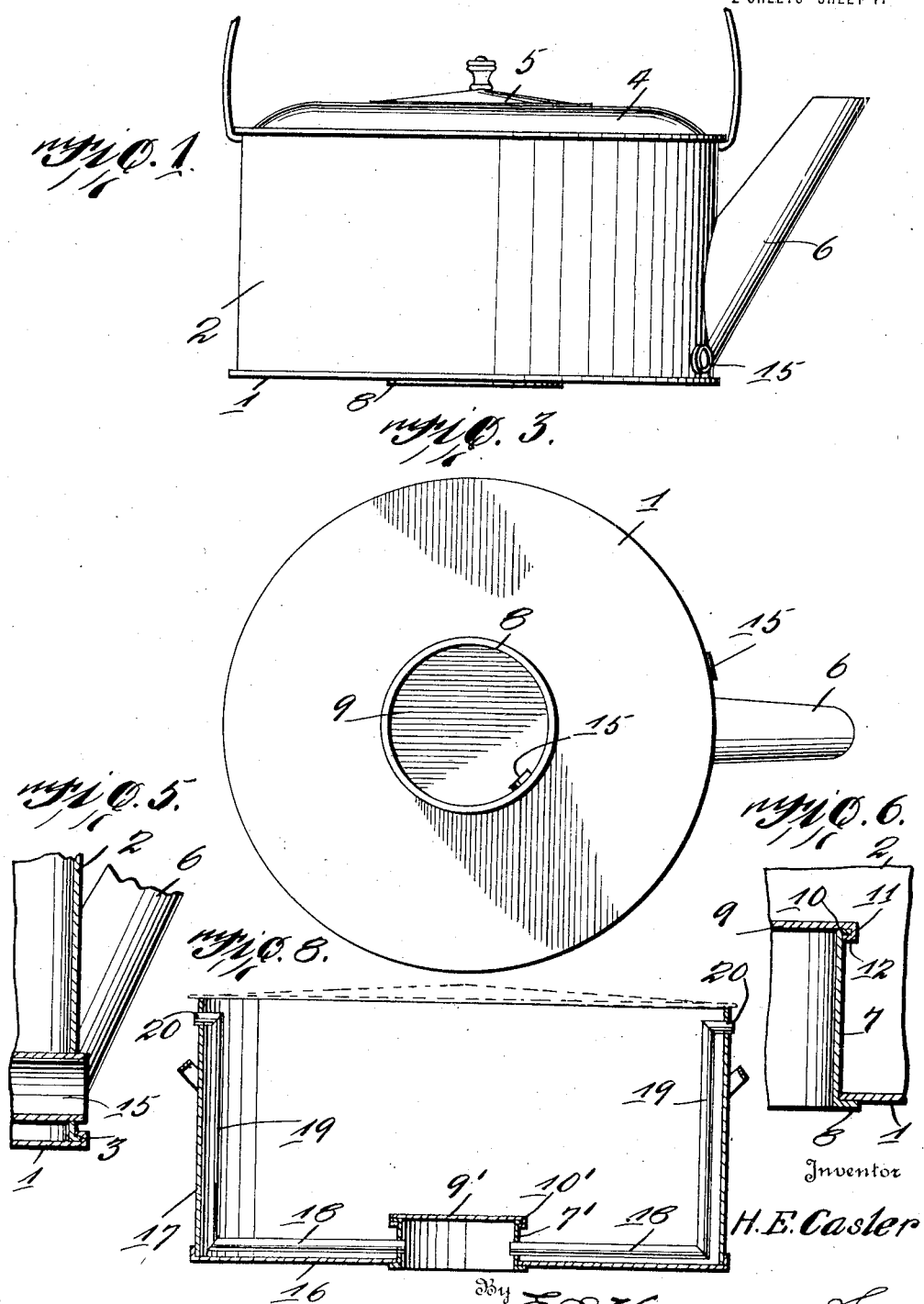

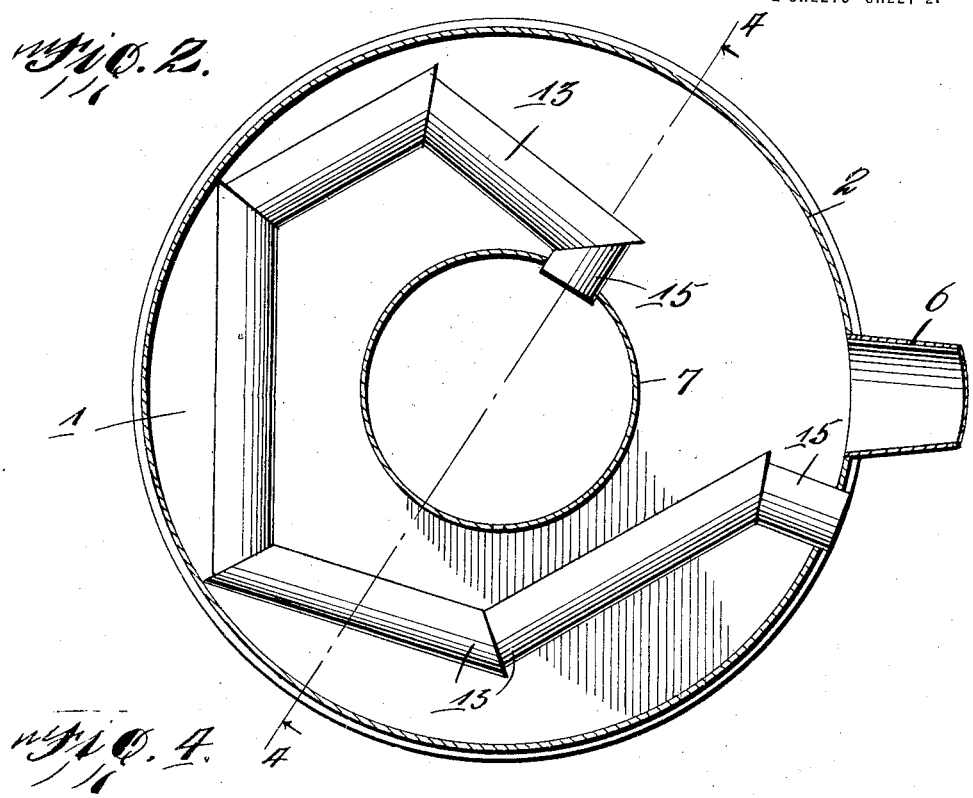
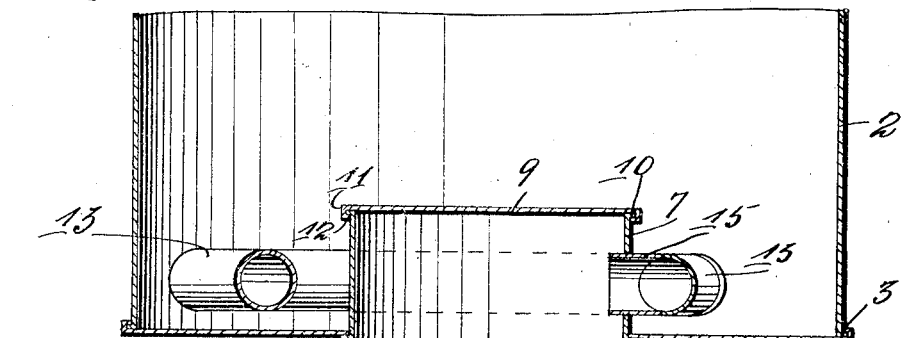
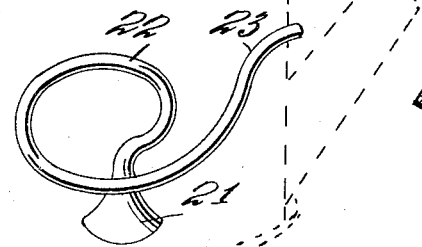
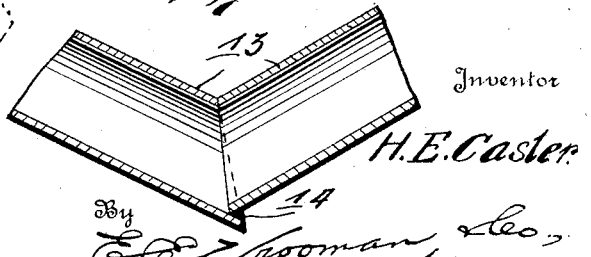

HAROLD EMERSON CASLER, OF CHARLOTTE, MICHIGAN, ASSIGNOR OF ONE-HALF TO J. W. SAWYER, OF CHARLOTTE, MICHIGAN.

TEAKETTLE.

1,330,169.   Specification of Letters Patent.   Patented Feb. 10, 1920.

Application filed September 24, 1917. Serial No. 192,953.

*To all whom it may concern:*

Be it known that I, HAROLD E. CASLER, a citizen of the United States of America, residing at Charlotte, in the county of Eaton and State of Michigan, have invented certain new and useful Improvements in Teakettles, of which the following is a specification, reference being had therein to the accompanying drawing.

This invention relates to a tea kettle, and has for its principal object the production of a simple and efficient means for utilizing the heat for heating the contents of the kettle in the shortest possible time.

Another object of this invention is the production of a receptacle having a flue formed therein, whereby the heat may be conducted through the flue which is positioned within the receptacle thereby increasing the heating surface within the receptacle and in this manner heating the contents of the receptacle in the shortest possible time.

A still further object of this invention is the production of a heating element for various receptacles which has a dome fixedly mounted within the receptacle adjacent the bottom thereof, whereby the dome will collect heat and discharge the heat into the flue connected to the dome and extending within the receptacle to communicate with the exterior thereof, whereby a large heating area is formed whereby the contents of the receptacle will be heated more quickly.

With these and other objects in view this invention consists of certain novel constructions, combinations and arrangements of parts as will be hereinafter fully described and claimed.

In the accompanying drawings:

Figure 1 is a side elevation of a tea kettle illustrating the exterior appearance thereof with the heating device attached.

Fig. 2 is a central horizontal section through the tea kettle showing the flue in a top plan.

Fig. 3 is a bottom plan view of the device.

Fig. 4 is a section taken on the line 4—4 of Fig. 2.

Fig. 5 is an enlarged fragmentary sectional view through the lower portion of the tea kettle illustrating the manner in which the flue communicates with the outer side of the tea kettle.

Fig. 6 is an enlarged fragmentary sectional view through a portion of the kettle and the dome, illustrating the manner in which this dome is formed.

Fig. 7 is a fragmentary sectional view through a pair of lengths of pipe used in forming the flue.

Fig. 8 is a longitudinal section through a receptacle, such for instance as a boiler, showing a slightly modified form of the heating device.

Fig. 9 is a detailed perspective view of one modified form of the dome and pipe illustrating in dotted lines the manner in which the same is applied to the tea kettle or other receptacle.

Referring to the accompanying drawings by numerals, it will be seen that the tea kettle comprises a bottom 1 having a wall 2 secured as shown at 3 in the usual manner, while the wall 2 is provided with a top 4 having a cover 5. The spout 6 extends from one side of the wall 2 for permitting the contents of the tea kettle to be emptied when desired.

The heating dome comprises a collar 7 having an outwardly extending annular flange 8 formed upon its lower portion and this collar 7 projects through the bottom 1 of the tea kettle so as to cause the flange 8 to engage the under surface of the bottom 1 so as to be secured by any suitable means such as solder for causing the dome to be fixedly mounted upon the tea kettle. The top 9 of the heating dome fits upon the outwardly extending annular flange 10 formed upon the upper edge of the collar 7 and this top 9 is provided with an overhanging flange 11 from which the annular lip 12 extends and the flange 11 and lip 12 will engage the flange 10 thereby permanently securing the top 9 upon the collar 7. While flanges will hold the heating dome in a set position, it is obvious that suitable material may be applied to the joints so as to prevent the heating dome from leaking.

The flue comprises a plurality of pipes 13 having their ends extending slightly into each other as shown at 14 in Fig. 7. It is of course obvious a single length of pipe may be applied for constituting the flue. Short pipes 15 are carried by the pipes 13 and one of these short pipes 15 projects through the collar 7 into the interior of the heating dome as shown in Figs. 2 and 4, while the remaining short pipe 15 projects through the wall 2 so as to communicate with the exterior of the tea kettle. It will be noted, however, that these pipes constitute the flue for receiving heated air gathered by the heating dome and then conduct the heated air through the flue and discharge the heated air adjacent the outer side of the tea kettle. This flue is spaced from the bottom of the tea kettle and extends for a considerable distance around the heating dome so as to present the maximum heating surface around which the contents of the tea kettle will rest, thus increasing the heating surface.

By referring to Fig. 8 it will be seen that a boiler is shown which comprises the usual bottom 16 having a side wall 17 carried thereon. The heating dome comprises the collar 7' having a top 9' secured thereto as shown at 10'.

The flue comprises straight pipes 18 extending from opposite sides of the heating dome although communicating with the interior of the dome. These pipes have vertically extending portions 19 spaced from the wall 2 secured to the boiler and the outwardly extending portions 20 of the vertically extending portions 19 project through the wall 17 to communicate with the exterior of the boiler so that heat may be conducted from the heating dome.

By referring to Fig. 9 it will be seen that a bell-like heating dome 21 is provided upon which there is formed a pipe 22. This pipe 22 is of a coil construction having an S-shaped portion 23 projecting through the outer surface of the tea kettle upon which the same is carried.

The heating dome and flue may be used upon receptacles of various designs without departing from the spirit of the invention, and therefore, it is not intended to limit the construction of this device to the specific form herein suggested, for it is intended to include all such forms of the invention as properly come within the scope of the claims.

What is claimed is:

1. In a device of the class described, the combination of a receptacle provided with a bottom and a side wall, said bottom provided with an opening, a heating dome extending through said opening of the bottom, said heating dome comprising a side having at its lower edge a horizontal flange engaging the bottom of the receptacle, and said dome provided at the upper end of the side with a horizontal flange, a top resting upon the upper flanged edge of the side of the dome, said top provided with a flanged edge surrounding said upper horizontal flange of the side of the dome, and a heat conducting angular pipe supported at its inner end upon the side of the dome and extending through said side and supported at its opposite end upon and extending through said side of the receptacle, said pipe being spaced intermediate its ends from the bottom and side of the receptacle.

2. In a device of the class described, the combination with a receptacle provided with a side and a bottom, said bottom provided with a central opening, of a dome having a side positioned in said central opening of the bottom of said receptacle, the side of said bottom provided with a horizontal bottom flange and with a horizontal top flange, the bottom flange of the dome resting snugly against the under face of the body of the receptacle, a top extending across said dome and having its edges surrounding the outer edges of the top flange of the side of the dome, and a pipe spaced above the bottom of the receptacle and having one end extending through the side of the dome and its opposite end extending through the side of the receptacle, substantially as shown and described.

In testimony whereof I hereunto affix my signature.

HAROLD EMERSON CASLER.